United States Patent [19]

Zanella

[11] Patent Number: 4,584,155

[45] Date of Patent: Apr. 22, 1986

[54] METHOD AND DEVICE FOR MANUFACTURING GLASS SHEETS HAVING SURFACE STRUCTURES MOLDED-ON BY SUPERFICIAL MOLDING

[75] Inventor: Guy E. A. Zanella, Cognin, France

[73] Assignee: Saint-Gobin Vitrage, Courbevoie, France

[21] Appl. No.: 614,035

[22] Filed: May 25, 1984

[30] Foreign Application Priority Data

May 30, 1983 [FR] France ................................ 83 08903

[51] Int. Cl.⁴ ........................ B29C 13/18; B29C 39/10
[52] U.S. Cl. ..................................... 264/252; 264/259;
425/117; 425/127; 425/129 R
[58] Field of Search .................. 264/252, 259; 52/400,
52/127.6, 400, 821–823, 716–718, 397, 403;
425/110, 127, 129 R, 117; 249/95; 49/391, 488,
501; 428/14, 192

[56] References Cited

U.S. PATENT DOCUMENTS

| | | | |
|---|---|---|---|
| 2,718,664 | 9/1955 | Schweitzer | 425/110 |
| 3,263,014 | 7/1966 | Deisenroth | 264/252 |
| 4,030,953 | 6/1977 | Rutschow et al. | 264/257 |

Primary Examiner—Willard E. Hoag
Attorney, Agent, or Firm—Oblon, Fisher, Spivak, McClelland & Maier

[57] ABSTRACT

The invention relates to superficial molding on glass sheets, by injection molding of plastic material.

According to the invention, a glass sheet 1 is inserted in a mold comprised of two plates and which define a generally planar junction surface wherewith one part of the mold, which part is delimited by a hermetic seal, is evacuated, which enables the central part of the glass sheet to be held in place, and according to a feature of the invention, the superficial molding is delimited by a molding seal which is capable of accommodating variations in the shape of the glass sheet and which can withstand the pressure associated with the injection molding of the plastic material.

10 Claims, 9 Drawing Figures

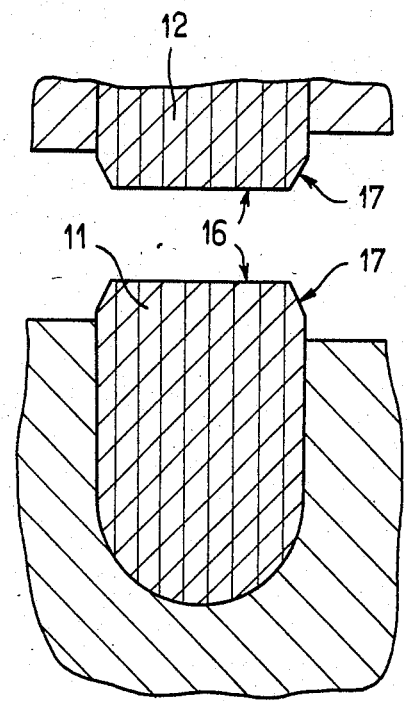
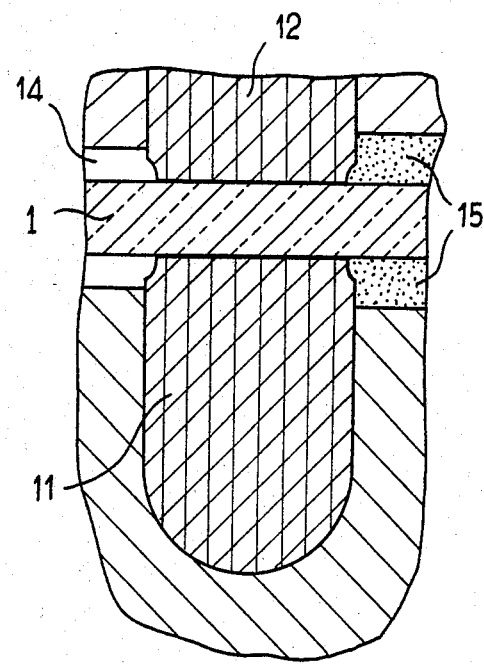
FIG. 2　　　　　　FIG. 3
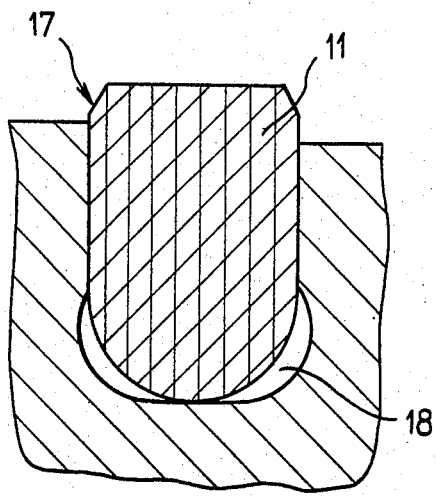
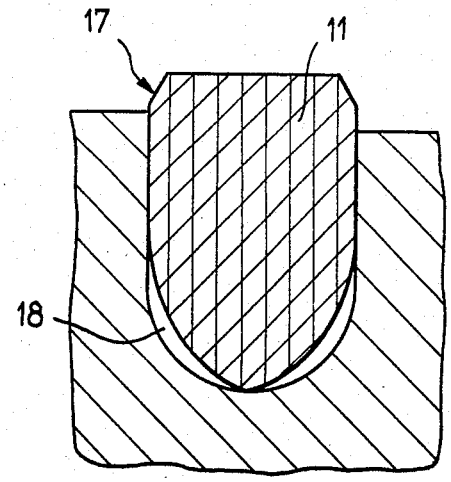
FIG. 4　　　　　　FIG. 5

METHOD AND DEVICE FOR MANUFACTURING GLASS SHEETS HAVING SURFACE STRUCTURES MOLDED-ON BY SUPERFICIAL MOLDING

BACKGROUND OF THE INVENTION

1. Field of the Invention

The invention relates to superficial molding on glass sheets, particularly glass sheets for windows of automobiles, yielding multifunctional units to be mounted in the automobile body.

2. Description of the Prior Art

Superficial molding on a glass sheet consists of adding one or more functional elements to at least a segment of the periphery of the sheet, to yield a multifunctional unit to be mounted in the automobile body. This technique offers major advantages and opens the door to numerous applications. In the case of a windshield, a rubber seal may be molded over the entire periphery of the glass, enabling the windshield to be mounted directly in the window aperture of the body by adhesive bonding. In this way the window can be mounted flush with the body, with major improvement in the air drag properties of the vehicle. In the case of a side window, one may carry out superficial molding on a door post or an entire door, to yield a unit with the glass already mounted, which unit can then be directly installed on the rest of the body, on the assembly line. Also, by superficial molding a hatch or rear door may be produced which includes the rear window. An advantage of all these possible applications of superficial molding to glass employed in automobile manufacture is that a number of individual assemblyline operations may be dispensed with, with a consequent reduction in manufacturing time.

Tempered glass is particularly suited as a substrate for superficial molding, due to its excellent resistance to both mechanical and thermal shock, but the superficial molding technique may also be used with other rigid transparent materials, such as, for example, ordinary glass or laminated glass.

In general, superficial molding on an aribitrary substrate is carried out by injection molding a plastic material over at least part of the periphery of the substrate object which the latter is held pressed between two mold plates by appropriate clamping means. Prior to this injection, a central evacuated zone is produced, with the aid of a hermetically sealed toric seal disposed in the mold, said evacuated zone aiding in the holding of the substrate object. The molded region is delimited by rigid bosses or a series of metal prominences, which may be coated with other materials and which can be provided in the structure of the mold. Classical molding methods employ high injection pressures, necessitating good mechanical resistance on the part of the substrate object.

Experiences shows that the above-described method, while it is a well developed technique for products with mechanical properties to which it is suited, is accompanied by a number of problems when applied to particularly fragile substrates or products such as glass.

After the substrate object is inserted between the two plates of the mold, there are two requirements which must be satisfied; the object must be held firmly between the plates, to prevent movement of the object, while at the same time the plastic material must be injected only over a previously delimited zone, without leakage or rough edges.

In the case of a substrate material which is not fragile, proper clamping may be assured by providing metal bosses in the structure of the mold, which bosses are employed to clamp the substrate object. But where the substrate objects are curved glass sheets produced in serial production, wherewith inevitably there are differences in curvature from one glass sheet to another, the use of rigid clamping and barrier elements can cause stresses beyond tolerance, resulting in breakage of the glass. Further, during the insertion of the glass sheet between the plates of the mold, longitudinal slippage may occur between the clamping element and the glass, which can cause undesirable scratching of the glass.

The constituent material of the clamping element which contacts both the glass and the molding material must be compatible with the latter, and in particular the molding material must not adhere to it. Further, said constituent material must have good mechanical resistacne to heat, in order to withstand the injection temperature of the molding material.

While one must not use an excessively rigid clamping element, one must also exclude excessively soft elements. Otherwise there is the risk that when the plastic material is injected, under the effect of the injection pressure, said plastic material will leak out of the region established for it. Thus a toric hermetically sealing seal alone may not be sufficient to achieve the desired result. It needs to be relatively soft in order to accomplish a seal, but as a result of this softness it may be unable to clamp the glass sheet tightly enough to avoid displacement and it may be unable to withstand the pressure of the injected material.

SUMMARY OF THE INVENTION

The invention proposes a method of superficial molding of plastic material injected under pressure, on a glass sheet as the substrate object, which method responds to the problem posed in that a supplementary seal is introduced which serves to delimit the superficial molding. This seal is disposed in a recess provided for the purpose in the plates of the mold, wherewith said seal displays an elasticity in a direction generally perpendicular to the surface of hte glass, in order to absorb variations in shape or curvature of the glass sheet, while at the same time displaying sufficient rigidity to withstand the injection pressure. After the polymerization of the injection molded plastic molding material is carried out in situ the mold plates are separated and the glass sheet with the surface structures now molded-on by superficial molding is removed from the mold.

According to one of the features of the invention, the supplementary seal is a seal comprised of two parts previously molded in a separate mold (not the mold in which the superficial molding is carried out) and then inserted into recesses provided for the purpose in the respective plates of the latter mold.

According to another feature of the invention, the seal is pliant such that variations in curvature from one glass sheet to another can be absorbed or accommodate without danger of breaking the glass sheets. For this purpose a seal is employed which preferably is comprised of a polyurethane elastomer material, which in partricular has excellent mechanical resistance properties up to temperatures on the order of 230° to 290° C., which temperatures are required in certain cases of superficial molding.

Advantageously, a seal material is employed having a Shore A hardness of around 65 to 95, preferably 80 to 90. This range of hardness represents a very good compromise between the conflicting requirements of pliability and mechanical resistance. If the seal has a Shore A hardness less than 65, it can deform under the pressure of the molding material during injection, with resulting rough edges and/or a poorly defined border of the molded material. Conversely if the seal has a Short A hardness greater than 95, one experiences the drawback of susceptibility to breakage of the glass which is attendant to a rigid metallic seal.

In addition to the question of the hardness of the material which basically comprises the seal, the configuration of the seal and of the recess in which the seal is disposed in the mold may both be chosen for special advantage in connection with the inventive method. There is a need on the one hand to avoid crumbling of the seal with repeated compressions, and on the other hand to avoid irregular distribution of plastic material during the injection. In particular if the portion of the compression seal which projects outwardly from the said recess has a curved shape, premature wear of the seal is experienced. It has been found instead that it is advantageous for this region to be tapered, i.e., for its cross-section to diminish symmetrically. This permits elastic compression without risk of crumbling or premature wear of the seal.

In order to further improve the performance of the seal and to provide optimal conditions for it to fulfill its function of compression seal, an expansion space may be provided between the seal and the recess in which the seal is disposed, at the level of the bottom of the pushed-in seal in the mold, whereby the seal may give way to some extent into this space when the two plates of the mold are subsequently pressed against the glass. In this way gross deformations of the outwardly projecting part of the seal which projects out of the recess can be avoid.

According to another feature of the invention, the seal is in the form of a more rigid seal, e.g., of a metal material, which is coated on its surface which contacts the glass (on either side), with a strip which does not scratch the glass, e.g., a strip of a Teflon ® material, wherewith there are also provided springs disposed between said rigid seal and the recess which accommodates it in the mold, said springs enabling accommodation to variations in the shape of the glass sheets, without danger of breakage of the glass. The material employed, e.g., coated metal, depends on requirements relating to the glass, particularly the requirement of ability to tolerate sliding during the insertion of the glass sheet into the mold without the surface of the glass being scratched.

According to a further feature of the invention, one part of the seal is in the form of a metal prominence coated with Teflon ® disposed on one of the plates of the mold, while the other part is essentially in the form of a pliant seal disposed in a recess cut into the other plate.

In another variant, the two-part supplementary seal comprises, on one of the plates of the mold, a Teflon ® coated metal prominence, and on the other plate a metallic seal which is coated with Teflon ® and which may be used in combination with a spring.

In a further variant, a pliant seal is combined with a metallic insert within said seal, said insert being disposed on the side of the seal which contacts the molding material.

The Teflon ® layer can be deposited, for example, by spraying.

This embodiment, comprising a pliant or soft seal with a metallic insert, permits one to advantageously combine the effect of a pliant seal and more rigid seal, to yield a superficial molding profile which is sharp and free from rough edges.

The invention also relates to a device for carrying out the method, said device comprised of two plates forming a mold, wherewith the plates are separated in their central region, which region communicates with an annexed system enabling said region to be evacuated, the purpose bieng to aid in holding the glass substrate object in place, and wherewith said plates comprise a seal which produces a hermetic seal and they further comprise a supplementary seal which is sufficiently pliant to accommodate possible variations in the shape of the glass sheet and at the same time is sufficiently rigid to delimit the extent of the superficial molding and to withstand the pressure and temperature of the injection without danger that the glass will be scratched or broken.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or correspondings parts throughout the several views and wherein:

FIG. 2 is a detail view of an example of a seal according to the invention;

FIG. 3 illustrates the joint of FIG. 2 during the superficial molding operation;

FIGS. 4 and 5 illustrates variants of the seal of FIG. 2 and the dispositions of these seals in the mold plates.

DETAILED DESCRIPTION OF THE PREFERRED EMBODIMENTS

Figure 1:
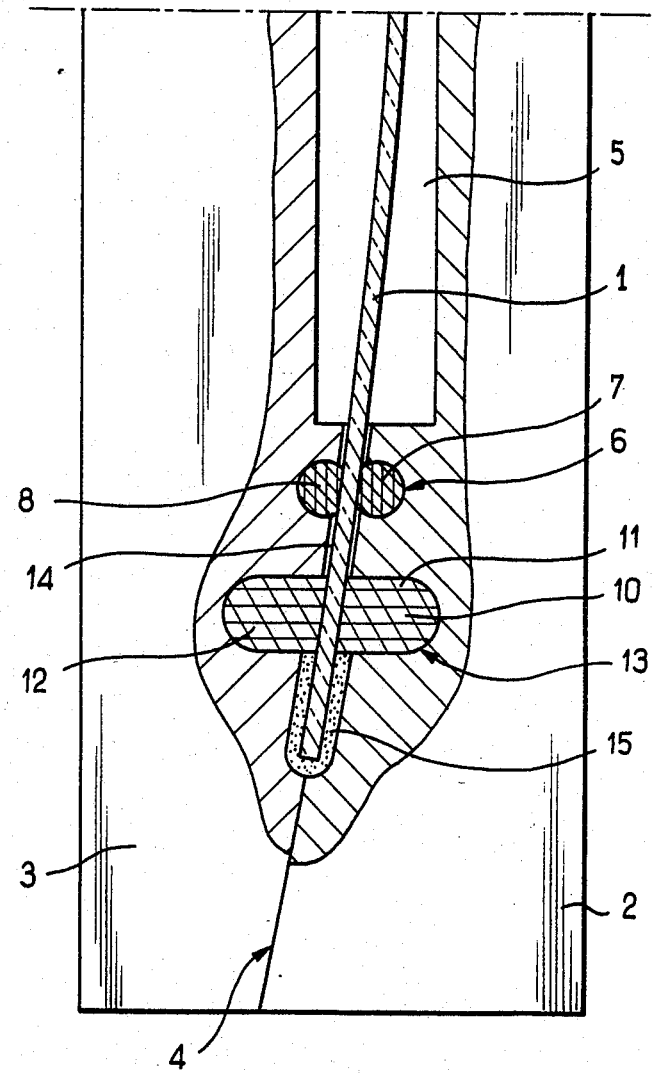
FIG. 1 illustrates a cross-sectional view of a glass sheet in the interior of a superficial mold device for carrying out the process according to the invention.

In the device illustrated in FIG. 1, the glass sheet 1 is held between the two metal plates 2 and 3 which are the pieces forming the mold and defining a generally planar junction surface 4. For convenience, the glass sheet is disposed vertically and is held by a system involving a void space in the central region 5 of the mold, said void space being bounded by a toric seal 6 in the form of a joint or gasket, which seal 6 is comprised of two parts 7 and 8 disposed in the respective plates of the mold. A compression joint 10 according to the invention, comprised of two molding seals 11 and 12 and serving to confine the injection of the material of the superficial molding, is disposed in respective recesses 13 provided for the purpose in the two plates of the mold. The parts of the two plates of the mold which correspond to parts of the glass sheet which are not to be subjected to superficial molding do not contact the glass. Such contact can involve a hazard of breaking the glass, and accordingly a gap 14 is provided between the surfaces of the glass and the respective plates of the mold, said gap 14 being sufficient to prevent any contact.

The mold may be slightly heated at the time of injection of the molding material 15. A great variety of materials may be injected, with different compositions, colors, and hardnesses, depending on the properties desired for the intended applications of the products. Commonly used materials include polystyrene, low and high density polyethylene, polypropylene, polyamides, polyvinyl chlorides, polyurethanes, etc. The basic materials may be reinforced by glass or carbon fibers and/or other fillers, etc. The addition of color is a purely esthetic rather than a technical consideration.

If the molding seal itself is comprised of polyurethane material, it is preferable that the molding material injected be other than a polyurethane in order to avoid the risk of the molding material adhering to the seal.

Preferably the glass sheet employed is tempered, for toughness, i.e., mechanical and thermal resistance, but the invention may also be applied to other types of rigid transparent materials such as, for example, laminated glass and hardened glass, provided that the temperatures and pressures experienced are compatible with the resistance properties of the transparent material.

When the two metal plates 2 and 3 are brought together there is formed a cavity 5. This cavity 5 is disposed with a means for creating a vacuum such as is well known in the art. A second cavity, shown filled with molding material 15 in FIG. 1 is also formed when metal plates 2 and 3 are brought together. This second cavity being disposed with an injection means as is well known in the art.

During operation, a vacuum is produced in the central part or cavity 5, a hermetic seal being provided by toric seal 6. Then the molding material 15 is injected via a conduit (not shown) provided in the structure of the mold.

FIG. 2 illustrates the two molding seals 11 and 12 of compression joint 10 in their respective accommodating recesses provied in the two plates 2 and 3 of the mold. (Here the two plates are being held apart.) The end of the outwardly projecting part of each molding seal has a taper 17.

FIG. 3 illustrates the compression joint during the superficial molding operation. The two molding seals 11 and 12 are pressed against the two faces of the glass sheet 1. The extremities of the compression joint are compressed under the force. The compression joint holds the glass in place and contains the expansion flow of the injected plastic material 15.

FIGS. 4 and 5 illustrate variants in which an expansion space 18 is provided laterally between the base of the molding seal and the recess 13, to permit elastic compression of the seal during the superficial molding.

Figure 6:
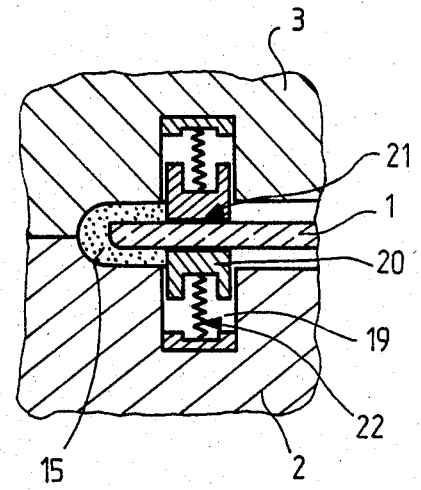
FIGS. 6 to 9 illustrate other embodiments of molds comprising compression-holding elements according to the invention.

FIG. 6 illustrates in very schematic form, a cross-section of plates 2 and 3 of a mold wherein a channel 19 has been cut to house a metal seal 20 covered with a layer of Teflon ® 21 and connected to a spring 22 to furnish the desired pliability.

Figure 7:
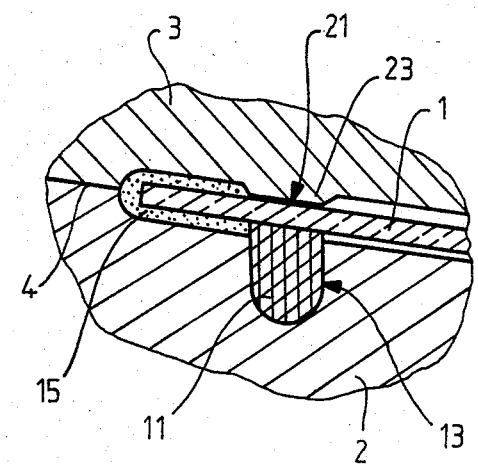

FIG. 7 illustrates another variant of the plates of a mold. The glass sheet 1 is held in place between plates 2 and 3 which define a generally planar junction surface 4. For simplicity, only that part of the mold is shown in which the superficial molding of the material 15 takes place.

Plate 3 of the mold comprises a prominence 23 comprised of metal coated with Teflon ® 21. Plate 2 comprises a pliant molding seal 11, e.g., a molding seal of polyurethane material. A large compressive force is exerted on the side of the glass corresponding to the pliant molding seal 11, which force is borne by the prominence 23 on the other side of the glass.

Figure 8:
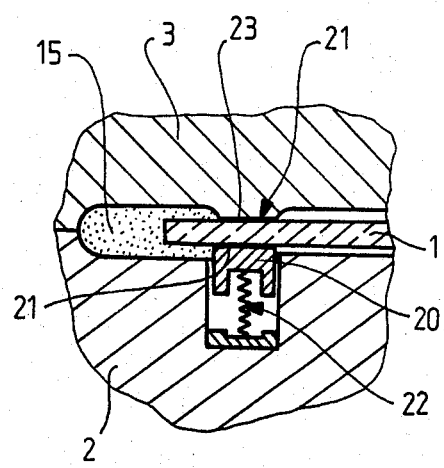

In the variant of FIG. 8, a metallic prominence 23 coated with Teflon ® 21 as in FIG. 7 is combined with a metal seal 20 connected to a spring 22 as in FIG. 6.

Figure 9:
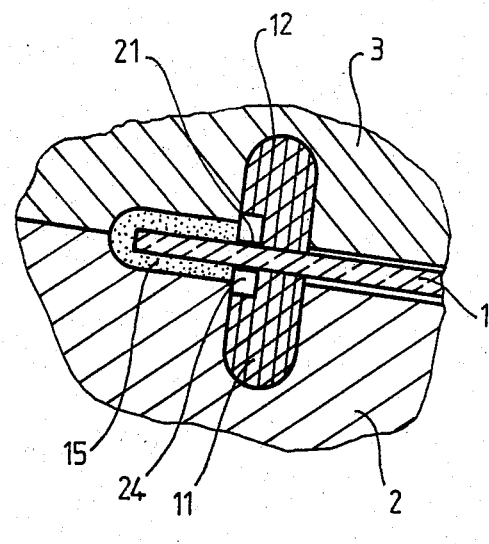

In the variant of FIG. 9, a metallic insert 24 coated with Teflon ® 21 on its contact surface with the glass is combined with a pliant polyurethane molding seal 11 and 12. This variant offers the combined advantages of the elasticity of the polyurethane to accommodate variations in the shape of the glass and the hardness of the metal to withstand the injection pressure of the material which is being molded. Further, it enables the use of polyurethane molding material, since direct contact between the injected material and the pliant seal has been eliminated.

EXAMPLE 1

This example describes the manufacture of a windshield with a peripheral thermoplastic border strip. A tempered glass sheet is held in a mold comprised of steel material, by clamping said sheet via the seal shown in FIG. 9 disposed in its corresponding recess. The molding seal has been fabricated by mixing a polymerizatin formulation, pouring or forcing this mixture into a mold, and carrying out polymerization to yield a polyurethane of Shore hardness 90, to which a metallic insert has then been added.

The material for the superficial molding is a thermoplastic polyurethane injected at 210° C. under a pressure of 90 bar.

After completion of the molding operation, the windshield has been furnished with a peripheral border strip the edges of which are perfectly defined.

EXAMPLE 2

This example describes the manufacture of a hatch or rear door for an automobile. The general conditions of the method are the same as in Example 1, but here the superficial molding is confined by the compression joint shown in FIGS. 2 and 3. The taper 17 of the molding seal reduces the effects of the pressure of the injected plastic material. In view of the nature of the product desired, a different superficial molding material is employed, namely polybutylene terephthalate, which enables one to take advantage of the excellent mechanical resistance and thermal properties of the molding seal, which in this case withstands at least 240° C. and 70 bar.

The product obtained after the molding operation has an excellent appearance.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. a method for superficially molding surface structure on a glass sheet, comprising:
    (a) inserting said glass sheet in an opened mold comprised of two plates, said mold having a first cavity delimited by a hermetic seal;
    (b) closing said mold by bringing said plates together;
    (c) evacuating said first cavity;
    (d) injecting an injection moldable plastic material into a second cavity in said mold, said second cavity defining the limits of the said molding with the aid of a molding seal which is disposed in at least one of the mold plates, said molding seal exhibiting elasticity in a direction generally perpendicular to the surface of the glass sheet and sufficient rigidity to withstand the injection, and comprising a Shore A hardness of between about 65 and 95;

(e) allowing polymerization of the said moldable plastic material;

(f) separating the said plates for the said molded plastic material;

(g) removing said glass sheet having the molded-on surface structure;

(h) said hermetic seal and said molding seal being different structures.

2. The method of claim 1 including molding said injection moldable plastic material over at least part of the periphery of said glass sheet.

3. The method of claim 1, said evacuation of the first cavity delimited by a hermetic seal aiding in holding the glass sheet in place.

4. The method of claim 1 wherein the molding seal comprises two parts previously molded in a separate mold and inserting said parts into recesses provided in the plates of the mold, said molding seal comprising an elastomer material having a Shore A hardness of between 75 and 90 and comprising heatsettable polyurethane.

5. The method of claim 6 including maintaining an expansion space between the molding seal and said recess.

6. The method of claim 1 including interposing a molding seal comprising a metal coated with Teflon ® and springs between said seal and said recess.

7. The method of claim 6 including interposing a molding seal comprising a metal insert between said plates.

8. The method of claim 1 including disposing a Teflon ® coated metal prominence on one of said plates and the other plate comprises a molding seal in a recess, wherein the metal prominence is aligned with the molding seal.

9. A device adapted for superficially molding surface structures on a glass sheet, said device comprising:

(a) two plates forming a mold.

(b) said two plates defining a first cavity and a second cavity, (c) said device further comprising a hermetic seal assuring a hermetic seal between said first cavity and said second cavity, (d) said device further comprising a molding seal; said molding seal being sufficiently elastic in a direction generally perpendicular to the glass sheet to accommodate possible variations in the shape of said glass sheet and also being sufficiently rigid to delimit the extent of the superficial molding when said superficial molding is injected in said mold, said molding seal being different from said hermetic seal.

10. The device of claim 9 wherein said molding seal is of a material which will not scratch or break said glass sheet.

* * * * *